(12) United States Patent
Kamra et al.

(10) Patent No.: US 8,655,839 B2
(45) Date of Patent: Feb. 18, 2014

(54) METHODS, SYSTEMS, AND MEDIA FOR FORMING LINEAR COMBINATIONS OF DATA

(75) Inventors: Abhinav Kamra, New York, NY (US); Vishal Misra, New York, NY (US); Jon Feldman, New York, NY (US); Daniel Rubenstein, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 312 days.

(21) Appl. No.: 12/281,457

(22) PCT Filed: Mar. 5, 2007

(86) PCT No.: PCT/US2007/005655
§ 371 (c)(1),
(2), (4) Date: Apr. 21, 2009

(87) PCT Pub. No.: WO2007/103353
PCT Pub. Date: Sep. 13, 2007

(65) Prior Publication Data
US 2009/0222477 A1    Sep. 3, 2009

Related U.S. Application Data

(60) Provisional application No. 60/778,801, filed on Mar. 3, 2006.

(51) Int. Cl.
*G06F 7/00*    (2006.01)
*G06F 17/30*   (2006.01)
*G06F 15/173*  (2006.01)

(52) U.S. Cl.
USPC ............................ 707/622; 709/229; 709/230

(58) Field of Classification Search
USPC .......... 707/693, 687, 622, 706, 913, 999.003, 707/999.005, 999.007; 709/229, 230
See application file for complete search history.

(56) References Cited

U.S. PATENT DOCUMENTS

2001/0047227 A1* 11/2001 Baraty .......................... 700/275
2005/0254106 A9* 11/2005 Silverbrook et al. .......... 358/539
(Continued)

OTHER PUBLICATIONS

Madden, S. "The Design of an Acquisitional Query Processor for Sensor Networks," In International Conference on Management of Data, Proceedings of the 2003 ACM SIGMOD International Conference on Management of Data, San Diego, California, pp. 491-502 [online]. Year of Publication: 2003. [retrieved on Aug. 25, 2007]. Retrieved from the Internet: <URL: http://www.eecs.harvard.edu/~mdw/course/cs263/papers/tinydb-sigmod09.pdf>.

(Continued)

*Primary Examiner* — Vincent F Boccio
(74) *Attorney, Agent, or Firm* — Wilmer Cutler Pickering Hale and Dorr LLP

(57) ABSTRACT

Methods, systems, and media for forming linear combinations of data are provided. In some embodiments, methods for forming a linear combination of data include: receiving at a device a first codeword, wherein the first codeword comprises a linear combination of at least a first data unit including data, and a second data unit including data; encoding at the device the first codeword and a third data unit including data to form a second codeword, wherein the second codeword includes a linear combination of at least the first data unit, the second data unit, and the third data unit; and transmitting from the device the second codeword.

38 Claims, 7 Drawing Sheets

(56) References Cited

U.S. PATENT DOCUMENTS

2006/0025897 A1\* 2/2006 Shostak et al. .................... 701/1
2008/0222532 A1\* 9/2008 Mester et al. ................. 715/738

OTHER PUBLICATIONS

International Search Report and Written Opinion issued for corresponding International Patent Application No. PCT/US2007/005655.

"TinyOS Homepage," http://www.tinyos.net, retrieved on Jul. 14, 2011.

Acedanski, S. et al., "How Good is Random Linear Coding Based Distributed Networked Storage," in Workshop on Network Coding, Theory and Applications, 2005, pp. 1-6.

Ahlswede, R. et al., "Network Information Flow," IEEE Transactions on Information Theory, vol. 46, No. 4, Jul. 2000.

Akyildiz, I.F. et al., "On Exploiting Spatial and Temporal Correlation in Wireless Sensor Networks," in Proceedings of WiOpt 2004: Modeling and Optimization in Mobile, Ad Hoc and Wireless Networks, Mar. 2004, pp. 71-80.

Albanese, A. et al., "Priority Encoding Transmission," in IEEE Transactions on Information Theory, vol. 42, No. 6, Nov. 1996.

Arici, T. et al., "PINCO: a Pipelined In-Network Compression Scheme for Data Collection in Wireless Sensor Networks".

Byers, J. et al. "Informed Content Delivery Across Adaptive Overlay Networks," in Proceedings of SIGCOMM, 2002.

Byers, J.W. et al., "A Digital Fountain Approach to Reliable Distribution of Bulk Data," in Proceedings of SIGCOMM, 1998, pp. 1-15.

Chandra, R. et al., "A Mesh-based Robust Topology Discovery Algorithm for Hybrid Wireless Networks," in Proceedings of AD-HOC Networks and Wireless, Sep. 2002.

Considine, J. "Generating Good Degree Distributions for Sparse Parity Check Codes using Oracles," in Technical Report, BUCS-TR 2001-019, Boston University, 2001, pp. 1-10.

Desnoyers, P. et al., "TSAR: A Two Tier Sensor Storage Architecture Using Interval Skip Graphs," in ACM Conference on Embedded Networked Sensor Systems, 2005, pp. 1-12.

Dimakis, A.G. et al., "Ubiquitous Access to Distributed Data in Large-Scale Sensor Networks through Decentralized Erasure Codes," in Information Processing in Sensor Networks, 2005, pp. 1-7.

Gkantsidis, C. et al., "Network Coding for Large Scale Content Distribution," in Proceedings of INFOCOM, 2005, pp. 1-11.

Havinga, P.J.M. et al., "Energy-Efficient Adaptive Wireless Network Design," in the Fifth Symposium on Computers and Communications, 2000, pp. 1-6.

Heinzelman W.R. et al., "Energy-Efficient Communication Protocol for Wireless Microsensor Networks," in Hawaii International Conference on Systems Sciences, 2000, pp. 1-10.

Ho, T. et al., "On Randomized Network Coding," in Allerton Annual Conference on Communication, Control and Computing, Oct. 2003, pp. 1-10.

Ignjatovic, Z. et al., "An Energy Conservation Method for Wireless Sensor Networks Employing a Blue Noise Spatial Sampling Technique," in Information Processing in Sensor Networks, 2003, pp. 1-3.

Intanagonwiwat, C. et al., "Directed Diffusion: A Scalable and Robust Communication Paradigm for Sensor Networks," in ACM Conference on Mobile Computing and Networking, 2000, pp. 1-12.

Karma, A. et al., "Encoding for Persistent Sensor Networks," in Allerton Annual Conference on Communication, Control and Computing, 2005, pp. 1-12.

Katti, S. et al., "The Importance of Being Opportunistic: Practical Network Coding for Wireless Environments," in Allerton Annual Conference on Communication, Control and Computing, 2005, pp. 1-10.

Koetter, R. et al., "An Algebraic Approach to Network Coding," IEEE/ACM Transactions on Networking, vol. 11, No. 5, Oct. 2003, pp. 782-795.

Li, M. et al., "PRESTO: Feedback-driven Data Management in Sensor Networks," in ACM/USENIX Symposium on Networked Systems and Design and Implementation, 2006, pp. 1-14.

Li, S.R. et al., "Linear Network Coding," IEEE Transactions on Information Theory, vol. 49, No. 2, Feb. 2003, pp. 371-381.

Lin, S. et al., "Error Control Coding: Fundamentals and Applications" 1983.

Luby, M. "LT Codes," in Symposium on Foundations of Computer Science, 2002, pp. 1-10.

Luby, M.G. et al., "Efficient Erasure Correcting Codes," IEEE Transactions on Information Theory, vol. 47, No. 2, Feb. 2001, pp. 569-584.

Manjeshwar, A. et al., "TEEN: A Routing Protocol for Enhanced Efficiency in Wireless Sensor Networks," in Parallel and Distributed Processing Symposium, 2001, pp. 1-7.

Marco, D. et al., "Reliability vs. Efficiency in Distributed Source Coding for Field-Gathering Sensor Networks," in Information Processing in Sensor Networks, 2004, pp. 1-8.

Motwani, R. et al., Randomized Algorithms, Cambridge International Series on Parallel Computation, 1995, pp. 57-64.

Pattem, S. et al. ,"The Impact of Spatial Correlation on Routing with Compression in Wireless Sensor Networks," in Information Processing in Sensor Networks, 2004, pp. 28-35.

Pradhan, S.S. et al., "Distributed Compression in a Dense Microsensor Network," in IEEE Signal Processing Magazine, vol. 19, No. 2, Mar. 2002, pp. 51-60.

Rabin, M.O. "Efficient Dispersal of Information for Security, Load Balancing, and Fault Tolerance," in Journal of the ACM, vol. 36, No. 2, Apr. 1989, pp. 335-348.

Sartipi, M. et al., "Source and Channel Coding in Wireless Sensor Networks using LDPC Codes," in EEE Communications Society Conference on Sensor and Ad Hoc Communications and Networks, 2004.

Scaglione, A. et al., "On the Interdependence of Routing and Data Compression in Multi-Hop Sensor Networks," in ACM Conference on Mobile Computing and Networking, 2002, pp. 1-8.

Wan, C. et al., "Siphon: Overload Traffic Management using Multi-Radio Virtual Sinks in Sensor Networks," in ACM Conference on Embedded Networked Sensor Systems, 2005.

\* cited by examiner

| Codeword Number | Cluster 1 Coefficient | Cluster 2 Coefficient | Cluster 3 Coefficient | Cluster 4 Coefficient |
|---|---|---|---|---|
| 1 mod 3 | Time period 1 codeword | Time period 4 codeword | Time period 7 codeword | |
| 2 mod 3 | Time period 2 codeword | Time period 5 codeword | Time period 8 codeword | |
| 0 mod 3 | Time period 3 codeword | Time period 6 codeword | Time period 9 codeword | |

352

| Codeword Number | Cluster 1 Coefficient | Cluster 2 Coefficient | Cluster 3 Coefficient | Cluster 4 Coefficient |
|---|---|---|---|---|
| 1 mod 3 | | Time period 4 codeword | Time period 7 codeword | Time period 10 codeword |
| 2 mod 3 | | Time period 5 codeword | Time period 8 codeword | Time period 11 codeword |
| 0 mod 3 | Time period 3 codeword | Time period 6 codeword | Time period 9 codeword | |

354

| Codeword Number | Cluster 1 Coefficient | Cluster 2 Coefficient | Cluster 3 Coefficient | Cluster 4 Coefficient |
|---|---|---|---|---|
| 1 mod 3 | | Time period 4 codeword | Time period 7 codeword | Time period 10 codeword |
| 2 mod 3 | | Time period 5 codeword | Time period 8 codeword | Time period 11 codeword |
| 0 mod 3 | | Time period 6 codeword | Time period 9 codeword | Time period 12 codeword |

METHODS, SYSTEMS, AND MEDIA FOR FORMING LINEAR COMBINATIONS OF DATA

CROSS-REFERENCE TO RELATED APPLICATION

This application is a U.S. National Phase Application under 35 U.S.C. §3.71 of International Patent Application No. PCT/US2007/005655 filed Mar. 5, 2007, which claims priority from U.S. Provisional Patent Application No. 60/778,801, filed on Mar. 3, 2006, each of which is hereby incorporated by reference herein in its entirety.

STATEMENT REGARDING FEDERALLY SPONSORED RESEARCH OR DEVELOPMENT

The government may have certain rights in the present invention pursuant to grants by the National Science Foundation (CNS-0435168, EEC-0433633, CNS-0442387, CNS-0411047, and CNS 0238299).

TECHNOLOGY AREA

The disclosed subject matter relates to methods, systems, and media for encoding sensor data.

BACKGROUND

Sensor networks have been widely used to monitor physical or environmental conditions across a geographical area. Typically, sensors (or sensor nodes) in a sensor network collect and store data so the data can subsequently be accessed. In this way, the sensor network can be viewed as a distributed database. An important requirement of a sensor network is that data collected by sensors in the network can be disseminated to end users.

One approach for retrieving data in a sensor network is for a user to query an individual sensor or a group of sensors for data collected by the sensor(s). The desired data can then be routed across the network from the sensor(s) to the user. However, sensors in a sensor network typically have very limited storage, bandwidth and/or computational power, and are often prone to failure, especially in situations where a sensor network is used to monitor emergency or disaster scenarios, such as floods, fires, earthquakes, and/or landslides. Due to these limitations, the foregoing approach may be infeasible or may incur unacceptable delay for certain applications.

Another approach is to use local data storage units (or data sinks) to collect data. A data storage unit can typically store a relatively large quantity of data collected by nearby sensors, and may respond directly to a querying node. A local data storage unit can be used to collect sensor data more effectively. However, in failure-prone sensor networks, valuable data that is collected by the sensors may still be lost before reaching a data storage unit. Therefore, it is desirable to efficiently collect and recover data in a failure-prone sensor network.

SUMMARY

Embodiments of the disclosed subject matter provide methods, systems, and media for forming linear combinations of data. Methods for forming a linear combination of data include: receiving at a device a first codeword, wherein the first codeword includes a linear combination of at least a first data unit including data, and a second data unit including data; encoding at the device the first codeword and a third data unit including data to form a second codeword, wherein the second codeword includes a linear combination of at least the first data unit, the second data unit, and the third data unit; and transmitting from the device the second codeword.

In some embodiments, systems for forming a linear combination of data include: a device that: receives a first codeword, wherein the first codeword includes a linear combination of at least a first data unit including data, and a second data unit including data; encodes the first codeword and a third data unit including data to form a second codeword, wherein the second codeword includes a linear combination of at least the first data unit, the second data unit, and the third data unit; and transmits the second codeword.

In some embodiments, computer-readable media are provided containing computer-executable instructions that, when executed by a processor, cause the processor to perform a method for forming a linear combination of data, the method includes: receiving at a device a first codeword, wherein the first codeword includes a linear combination of at least a first data unit including data, and a second data unit including data; encoding at the device the first codeword and a third data unit including data to form a second codeword, wherein the second codeword includes a linear combination of at least the first data unit, the second data unit, and the third data unit; and transmitting from the device the second codeword.

BRIEF DESCRIPTION OF THE DRAWINGS

FIG. 3D is a diagram illustrating an example of memory usage of a sensor in storing multiple codewords according to some embodiments.

DETAILED DESCRIPTION

Methods, systems, and media for forming linear combinations of data are provided. Using various embodiments, data collected by sensors in a sensor network can reach one or more data storage units in the sensor network and be recovered in an efficient manner, even when sensors in the network fail. In some embodiments, computing devices in a peer-to-peer (P2P) network can encode and transmit blocks of a file, so that a file can be distributed within the P2P network effectively.

In some embodiments, a sensor network can include sensors that take measurements of the surrounding environment and record the measurements as data units. The sensors can also encode one or more data units into one or more codewords, and exchange the data units and/or codewords with other sensors in the sensor network. Upon receiving a codeword from another sensor, a sensor in the sensor network can further encode the received codeword with another data unit or codeword that is stored at the sensor to form a new codeword. The number of data units that is encoded in the new codeword can, therefore, be greater than the number of data units that is encoded in the received codeword. The sensor network can also include one or more data storage units. A data storage unit can receive data units and/or codewords from one or more sensors in the sensor network and may decode the received codewords to recover data units that have been encoded.

Figure 1:
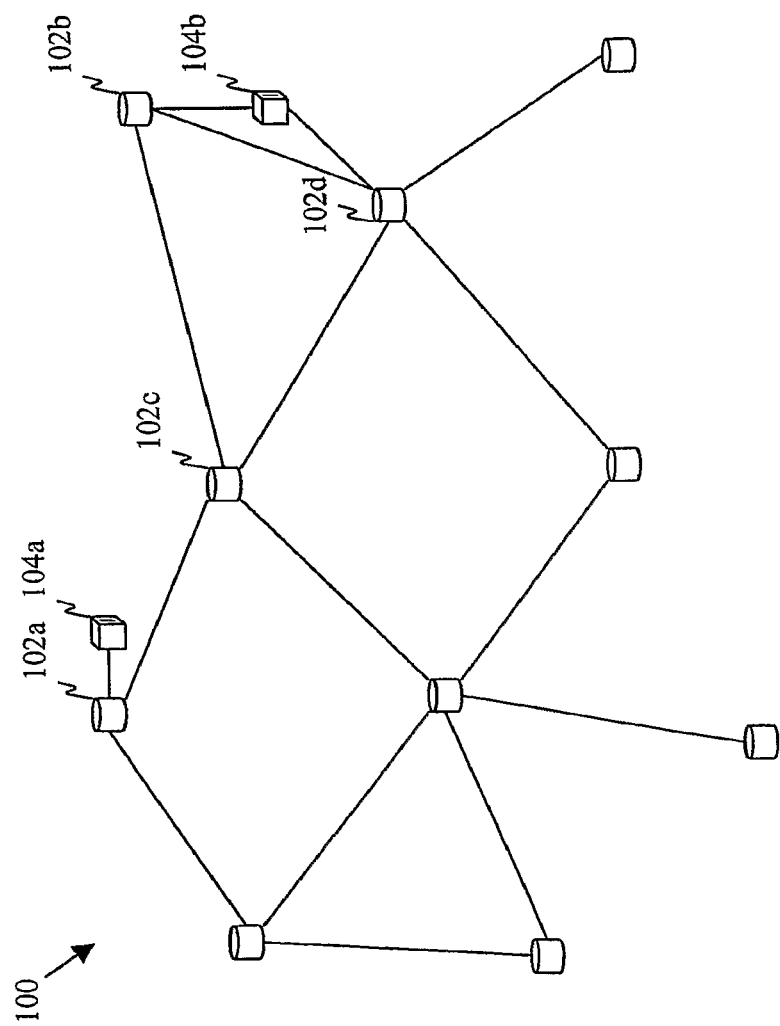
FIG. 1 is a diagram illustrating a sensor network according to some embodiments.

FIG. 1 is a diagram illustrating sensor network 100 according to some embodiments. Sensor network 100 can include a number of sensors (e.g., sensors 102a, 102b, 102c, 102d) distributed across a geographical area. Each sensor can take measurements of the surrounding environment and store measured data as one or more data units (or data symbols). In some embodiments, a sensor can take measurements periodically. A sensor may also compress measured data to reduce the size of stored data units. Each sensor (e.g., sensor 102b) in network 100 can communicate with one or more neighboring sensors (e.g., sensor 102c, 102d), using, for example, a wireless link based on the Institute of Electrical and Electronics Engineers (IEEE) 802.11 standard.

Sensor network 100 can also include one or more data storage units (e.g., data storage unit 104a, 104b). A data storage unit (e.g., data storage unit 104a) can have a larger storage capacity than a sensor in the sensor network (e.g., sensor 102c). A data storage unit (e.g., data storage unit 104b) can be configured to communicate with one or more sensors (e.g., sensors 102b, 102d). For example, a sensor (e.g., sensor 102b) that is in communication with a data storage unit (e.g., data storage unit 104b) can be configured to automatically send all obtained data to the data storage unit. A data storage unit (e.g., data storage unit 104b) can also query the sensors (e.g., sensor 102b) to retrieve data from the sensors. Because sensors (e.g., sensors 102b, 102d) that are in communication with a data storage unit (e.g., data storage unit 104b) can also communicate with other sensors (e.g., sensor 102c), a data storage unit (e.g., data storage unit 104b) can indirectly receive data from sensors (e.g., sensor 102c) that do not have a direct communication link with the data storage unit.

In some embodiments, sensors (e.g., sensor 102b) can have computational power to manipulate data in transit (e.g., data from sensor 102c to data storage unit 104b). For example, a sensor can compress or recode data to increase delivery efficiency. In some embodiments, sensors in a network may have no information on the location of the data storage units and/or the topology of the network, in which case a sensor can randomly choose one or more neighboring sensors for sending or receiving data in an attempt to deliver data to a data storage unit in the network.

Sensors in network 100 can encode one or more data units into codewords using erasure codes, including optimal erasure codes such as Reed-Solomon codes or erasure codes based on sparse bipartite graphs such as Tornado or Luby Transform (LT) codes. In some embodiments, a codeword is formed as a linear combination of data units and/or other codewords. In some embodiments, exclusive-or (XOR) based codes can be used to form a linear combination of data units and/or codewords. For example, bitwise XOR operations can be performed on data units to form a portion of a codeword (another portion can be a coefficient used for identifying the data units, as described below). In these embodiments, the portion of the codeword formed can have substantially the same size as the data units encoded. In this document, the number of data units used to form a codeword is referred to as the degree of the codeword.

Sensors in network 100 can exchange data units and/or codewords with neighboring sensors. This can be done at, for example, predetermined time intervals. As a result, although a sensor (e.g., sensor 102b) may initially only have data units generated by itself, the sensor can obtain data units and/or codewords generated by other sensors (e.g., sensors 102a, 102c) over time. Therefore, data recorded by a sensor (e.g., sensor 102c) in network 100 can be duplicated at other sensors (e.g., sensor 102b) and recovered even if the sensor (e.g., sensor 102c) fails. In addition, sensors in network 100 may utilize source coding techniques to reduce the amount of data to be delivered by compressing the data in space and/or time.

Figure 2C:
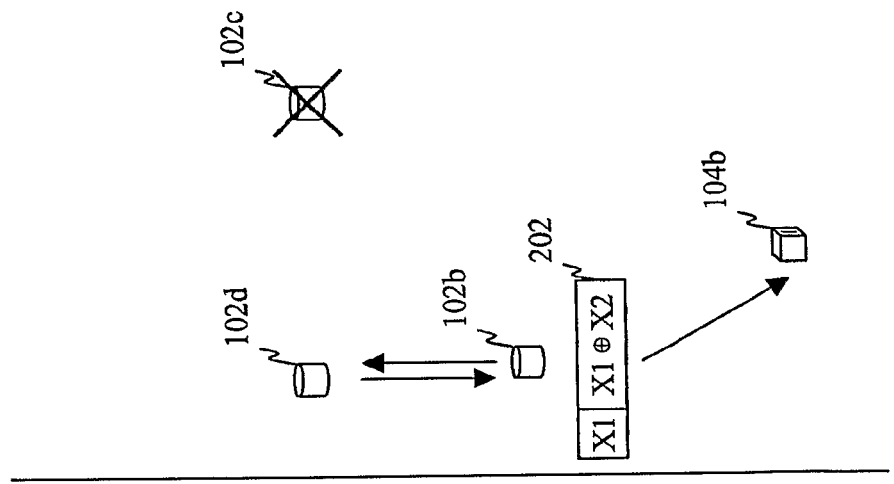
FIG. 2C is a diagram illustrating another exchange of data units between sensors in the sensor network shown in FIG. 2A at a second time instance according to some embodiments.
Figure 2B:
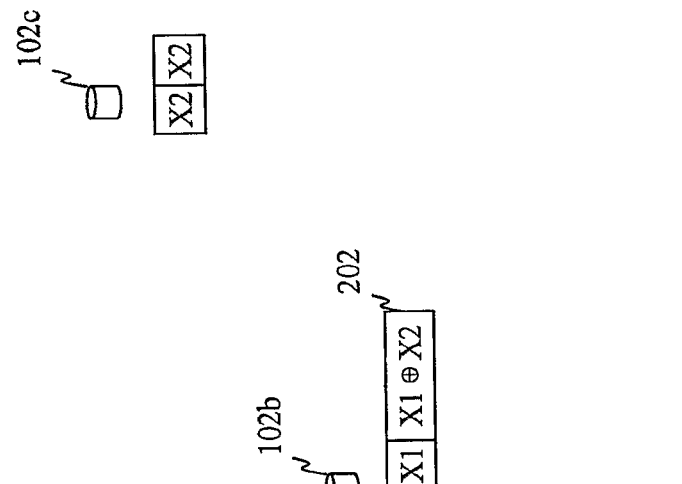
FIG. 2B is a diagram illustrating the encoding of data units by a sensor shown in FIG. 2A according to some embodiments.
Figure 2A:
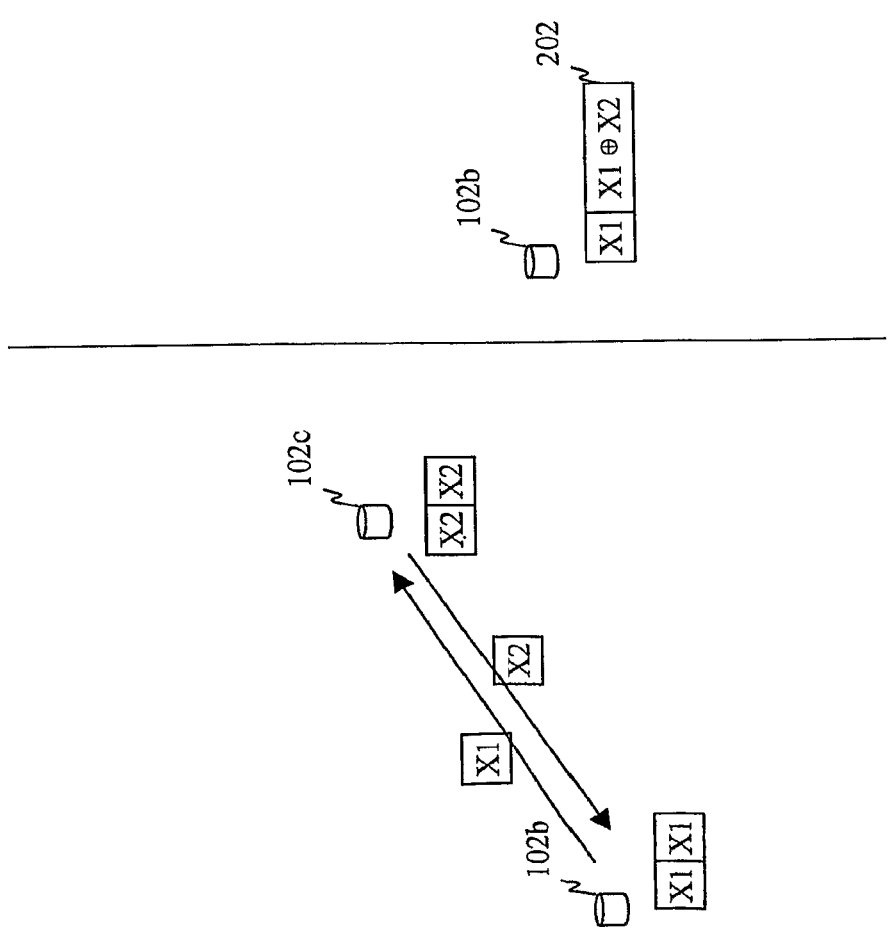
FIG. 2A is a diagram illustrating an exchange of data units between sensors in a sensor network according to some embodiments.

FIGS. 2A, 2B, and 2C are diagrams that illustrate the exchange of codewords among sensors in network 100 at different times according to some embodiments. As shown in FIG. 2A, sensor 102b may initially have data unit X1, and sensor 102c may initially have data unit X2. They can then exchange their data units (or codewords encoded from the data units). As shown in FIG. 2B, after receiving data unit X2, sensor 102b can encode the received data unit X2 with the data unit X1 by performing, for example, a bitwise XOR operation (the result is shown as codeword 202 in FIG. 2B). At a later time, as shown in FIG. 2C, sensor 102c may fail. However, codeword 202 encoded from data units X1 and X2 can remain at sensor 102b. At this point, sensor 102b can further exchange this or other data with sensor 102d and/or send this or other data to data storage unit 104b.

Figure 3A:
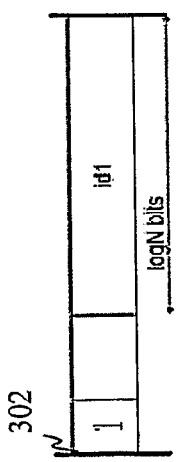
FIG. 3A is a diagram illustrating a format for constructing a coefficient for a codeword generated without coding according to some embodiments.

A codeword can include a coefficient that describes and identifies the data unit(s) from which the codeword is formed. For example, each sensor in network 100 can have a unique identifier (ID), and can attach this ID to a data unit generated by the sensor. A codeword that is formed from i data units can include i of these IDs to identify each of the i data units. In some embodiments, sensor network 100 encodes a single data unit to form a codeword, and a single ID can be included in the coefficient to identify the data unit. In this case, as shown in FIG. 3A, the coefficient can include a first bit "1" (at reference numeral 302), indicating that the codeword includes only one data unit, and log(N) bits specifying which data unit makes up the codeword, where N is the total number of data units.

Figure 3B:
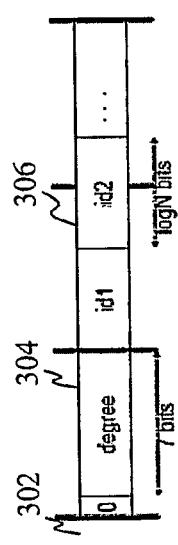
FIG. 3B is a diagram illustrating a format for constructing a coefficient for a codeword of lower degree according to some embodiments.

In some embodiments, sensor network 100 can encode one or more data units to form a codeword. In these embodiments, coefficient in a codeword may be constructed using two different formats as illustrated respectively by FIGS. 3B and 3C. When the number of data units forming the codeword is low (in particular, less than N/log(N)), less space is consumed by listing the IDs of the data units. In this case, the coefficient can be constructed in the format as shown in FIG. 3B, where the first bit 302 can indicate the particular format. The first bit 302 can be followed by a number of bits 304 (e.g., 7 bits) indicating the number of data units encoded in the codeword. The remaining bits 306 can store the IDs of the data units.

Figure 3C:
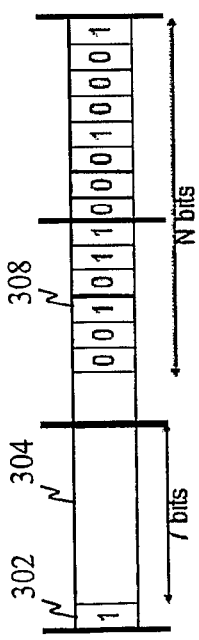
FIG. 3C is a diagram illustrating a format for constructing a coefficient for a codeword of higher degree according to some embodiments.

When the number of data units forming the codeword is greater than N/log(N), less space is consumed by reserving a bit for each of the N possible data units. In this case, as shown in FIG. 3C, the coefficient can include a first bit 302 indicating the particular format being used, followed by a number of bits 304 (e.g., 7 bits) indicating the number of data units encoded in the codeword. Bits 304 can be followed by N bits 308 where a "1" bit signifies the presence of a particular data unit and a "0" bit specifies the absence of a particular data unit. When the number of data units forming the codeword is equal to N/log(N), either format shown in FIG. 3B or FIG. 3C can be used. The ways of constructing a coefficient illustrated in FIGS. 3A, 3B, and 3C are only presented as examples, and various other suitable approaches can be used.

Referring back to FIG. 1, sensors in network 100 can take measurements and generate new data units in successive time periods. In this case, the size of the coefficients can become significant for codewords encoded from a relatively large number of data units. To reduce coefficient overhead across successive time periods, clustering may be used. A cluster can be a set of codewords across several time periods. Codewords can all refer to a single coefficient in the cluster, thereby eliminating redundant coefficients.

FIG. 3D illustrates an example of how memory can be used with clustering, in which the number of codewords (of different time periods) per cluster is 3. A cluster's codeword generated at the earliest time period is numbered 1 (mod 3), and the codeword generated at the latest time period is numbered 0 (mod 3). In this example, there is sufficient memory to store nine codewords and four coefficients. Table 350 illustrates nine codewords (of time periods 1 to 9) stored in memory at a first time instance. The nine codewords belong to clusters 1 to 3 as shown. Later, when two new codewords of time periods 10 and 11 are to be stored, codewords of time periods 1 and 2 can be removed to make room for the new codewords, which can then be stored as cluster 4 as shown in Table 352. As shown in Table 354, when time period 12's codeword is generated, codeword of time period 3 can be removed, and hence cluster 1 can be completely removed at that time. Similarly, when codeword of time period 13 is generated, cluster 5 can be initially formed (not shown), and codeword of time period 4 can be removed, but codewords of time periods 5 and 6, and hence the coefficient of cluster 2, can remain.

Figure 4:
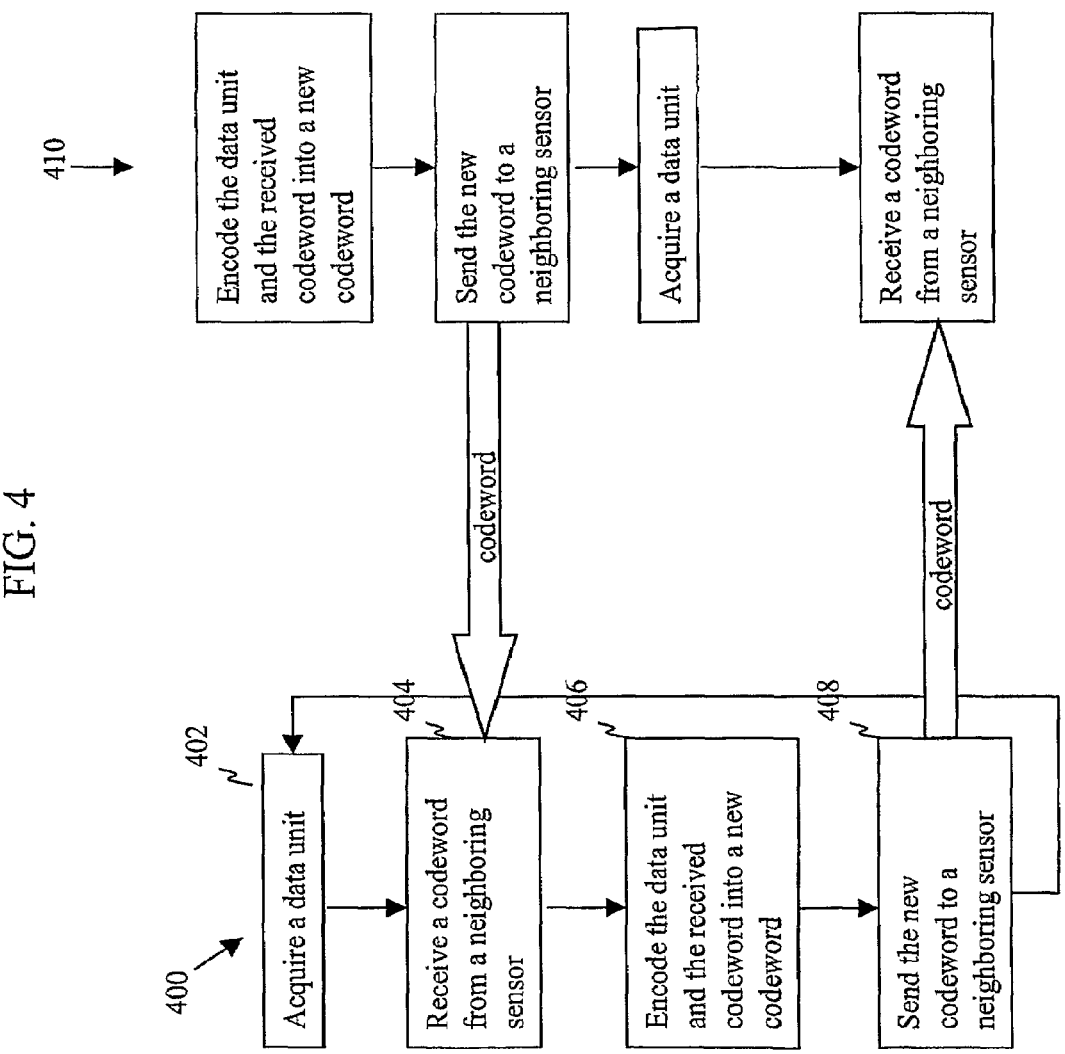
FIG. 4 is a diagram illustrating a method for collecting and recovering data according to some embodiments.

FIG. 4 is a diagram illustrating method 400 that can be used by sensors (e.g., sensor 102b) in network 100 for collecting and encoding data according to various embodiments. At 402, sensor 102b can acquire a data unit by measuring the surrounding environment. As shown, at 404, sensor 102b can receive a codeword from a neighboring sensor (e.g., sensor 102c), during, for example, a codeword exchange. The received codeword can include a linear combination of one or more data units that have been acquired by other sensors in network 100. At 406, sensor 102b can encode the acquired data unit and the received codeword to form a new codeword, which can be a linear combination of the data unit and the codeword. In particular, the encoding can include a bitwise XOR operation. At 408, sensor 102b can send the new codeword to neighboring sensor(s). Different sensors in network 100 can repeatedly perform method 400 and exchange codewords with one another. For example, as illustrated by the interrelationship between methods 400 and 410, a sensor performing method 400 may exchange data from another sensor that is performing method 410. In some embodiments, sensors can exchange codewords in a synchronized manner, so that exchanges between pairs of sensors in the network occur at predetermined time intervals. Alternatively, sensors in network 100 may not be synchronized.

Upon receiving codewords from sensors (e.g., sensors 102b, 102d), data storage units (e.g., data storage unit 104b) can decode the received codewords and recover the original data units from the codewords. In some embodiments, a data storage unit (e.g., data storage unit 104b) can first recover data units from codewords that are formed from only one data unit. Then, if it is found that a codeword is formed from recovered data units and only one other data unit that has not been recovered, that data unit can be recovered. For example, if the codeword is encoded by performing XOR on data units, the data unit can be recovered by also performing XOR on the codeword and the recovered data units.

Figure 5:
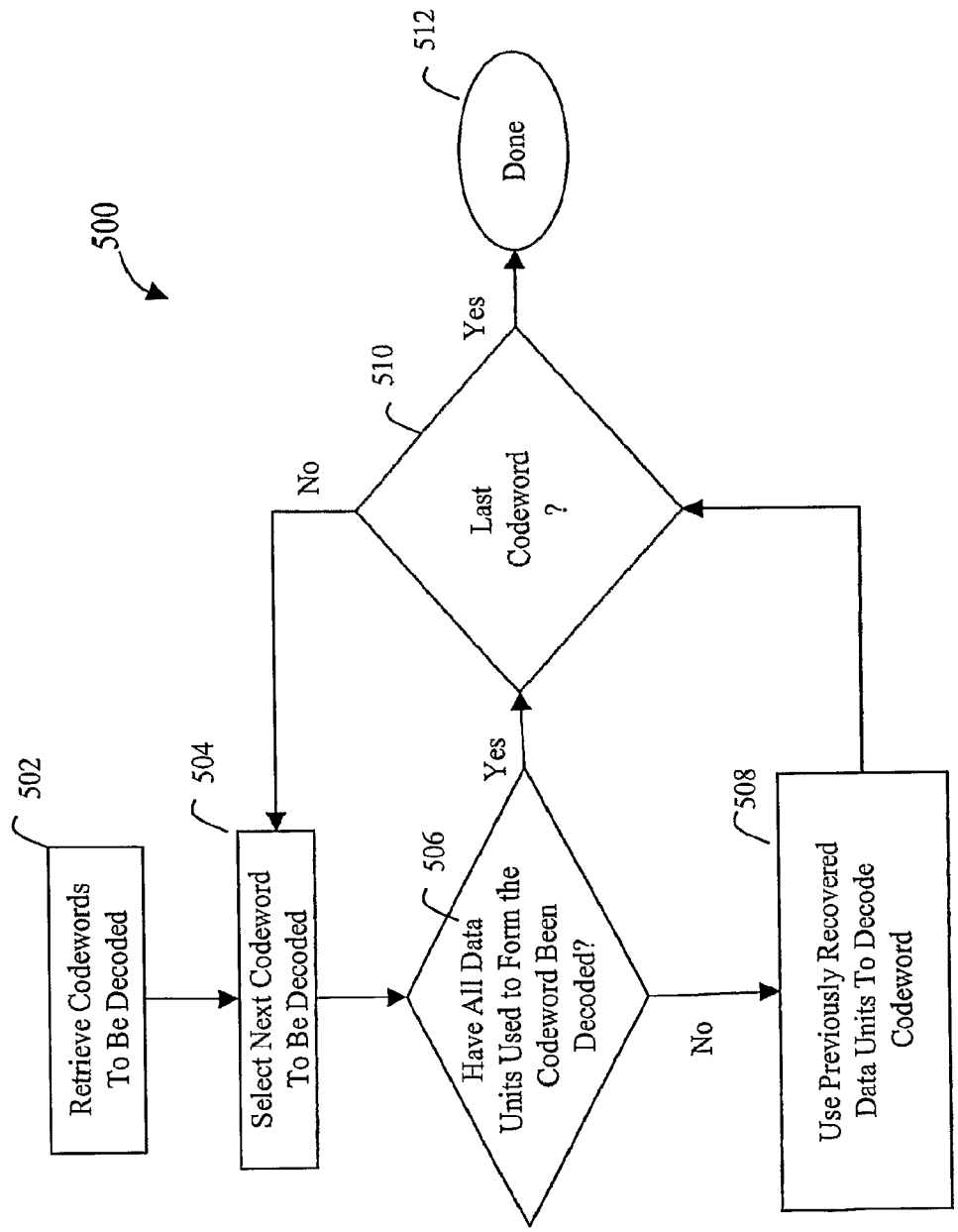
FIG. 5 is a diagram illustrating a method for decoding codewords according to some embodiments.

FIG. 5 illustrates a method 500 for decoding codewords to provide recovered data units in accordance with some embodiments. This method can be performed in one or more of sensors 102a, 102b, 102c, or 102d and/or data storage units 104a and 104b, and can be performed for all, some, or a particular codeword that need to be decoded. As shown, at 502, one or more codewords to be decoded can be retrieved. This can include transferring the codewords from one form of memory to another, simply identifying codewords to be decoded, or a combination of the same. 502 can alternatively be omitted in some embodiments. At 504, a codeword to be decoded can then be selected. For example, initially codewords with exactly one unrecovered data unit in them (e.g., degree one) can be selected until all such codewords have been decoded. As another example, codewords can be selected so that codewords with the fewest number of unrecovered data units encoded in them can be selected. As yet another example, codewords that will assist in the decoding of another codeword can be selected. Next, at 506, method 500 can determine whether all data units used to form the selected codeword have already been recovered. If not, the codeword can then be decoded, at 508, using previously recovered data units. For example, if two data units X1 and X3 were encoded to form a codeword, and X1 was previously recovered, then X1 can be used with the codeword to recover X3 from the codeword. This will result in X1 and X3 subsequently being recovered and available to decode a codeword containing X1, X3, and X5 so that X5 can be recovered (for example). If a codeword only contains a single data unit, no other data units are necessary to recover the single data unit from the codeword. In some embodiments, if a data unit that is not available is needed to decode a codeword, the decoding of the codeword may be postponed or cancelled in method 500. If postponed, the codeword may be re-selected in a subsequent performance of 504. After the codeword has been decoded at 508, if it was determined at 506 that the codeword was already decoded, or if the codeword could not be decoded, then method 500 can determine at 510 if the last codeword has been decoded. The last codeword may be the last codeword of all codewords in the sensor or storage unit, may be the last needed codeword for some purpose, or may be another suitable codeword. If it is determined that the last codeword has not been decoded, method 500 can loop back to 504. Otherwise, method 500 can terminate at 512. In addition, various other suitable methods for recovering data units can be used. For example, a Gaussian elimination method may be used to recover more data units.

Figure 6A:
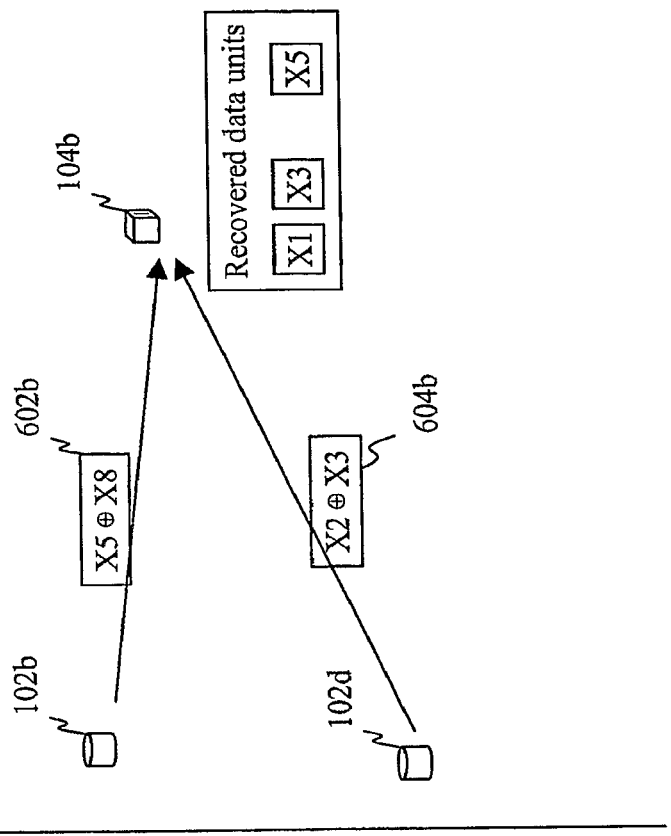
FIG. 6A is a diagram illustrating the reception of codewords at a data storage unit according to some embodiments.
Figure 6B:
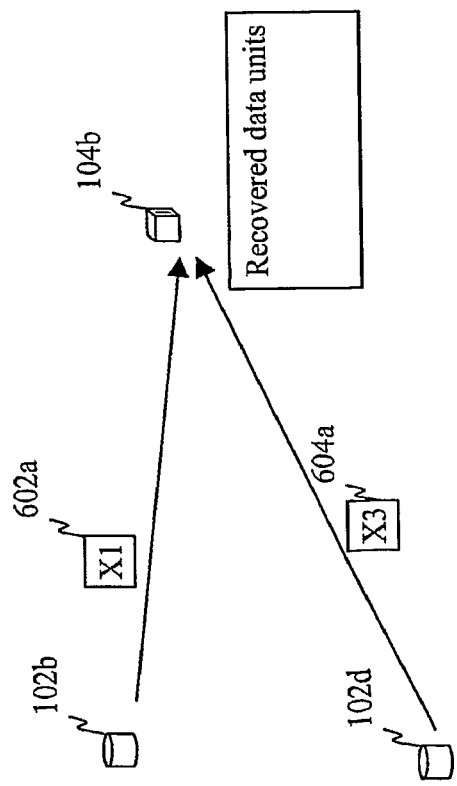
FIG. 6B is a diagram illustrating the reception of codewords at the data storage unit illustrated in FIG. 6A at a second time instance according to some embodiments.

Sensors in network 100 can be configured so that codewords generated by the sensors start with degree 1, but gradually increase in terms of their degree over time. The result is that data storage unit(s) (e.g., data storage unit 104b) of network 100 receive codewords of increasing degree over time, as is illustrated by FIGS. 6A and 6B. FIG. 6A is a diagram illustrating the first codewords 602a, 604a received by data storage unit 104b. These codewords, sent respectively from sensors 102*b* and 102*d*, are each formed from a single data unit (e.g., X1 or X3) as shown. At a later time, shown in FIG. 6B, codewords 602*b*, 604*b* received by data storage unit 104*b* are each formed from two data units (e.g., X5 and X8, or X2 and X3).

In sensor network 100, generating codewords with gradually increasing number of data units encoded can improve the recovery of data units. It can be proved that to recover r data units such that r<=R1=(N−1)/2, codewords that follow an optimal degree distribution all have degree one, and the expected number of encoded codewords required is:

$$K_1 = \sum_{i=0}^{R_1-1} \frac{N}{N-i} \qquad (1)$$

(A degree distribution is a probabilistic distribution on the degree of the codewords.)

Hence, if most of the network sensors fail and only a small amount of data survives, then not using any coding is the best way to recover a maximum number of data units. To recover r data units such that r<=$R_j$=(jN−1)/(j+1), where N is the total number of data units, codewords that follow an optimal degree distribution are of degree j or less only. Also, to recover $R_j$=(jN−1)/(j+1) data units, the expected number of encoded symbols required is at most:

$$K_j \le K_{j-1} + \sum_{i=R_{j-1}}^{R_j-1} \frac{{}^N C_j}{{}^i C_{j-1}(N-i)} \qquad (2)$$

Therefore, it is efficient to use only degree one codewords to recover the first $R_1$ data units, only degree 2 symbols to recover the next $R_2$-$R_1$ data units, and so on. Furthermore, an expected number of $K_1$ codewords are required to recover $R_1$ data units, an expected maximum $K_2$ codewords are required to recover $R_2$ symbols, and so on. Hence, for a total of k encoded symbols, $K_1$ degree 1 codewords can be used so that an expected $R_1$ data units can be recovered, $K_2$-$K_1$ degree 2 symbols can be used so that an expected $R_2$-$R_1$ codewords can be recovered, and so on, as long as the k symbols are not yet received. As a result, a near optimal degree distribution can be defined as:

$$\pi^*(k): \pi_i^* = \max\left(0, \min\left(\frac{K_i - K_{i-1}}{k}, \frac{k - K_{i-1}}{k}\right)\right) \qquad (3)$$

With this degree distribution, it can be shown that a data storage unit (e.g., data storage unit 104*b*) in network 100 can be expected to recover all N of the data units from only a little more than N codewords.

To generate codewords with increasing degree, a sequence of increasing values from $T_1$ to $T_N$ can be hard-coded into each of one or more sensors in network 100 prior to their deployment. Each value of $T_i$ indicates a period of time from some initial point in time after which codewords of degree i can be generated. For example, in some embodiments, before the end of a period $T_2$, a sensor will only generate codewords with a degree of 1. After the end of period $T_2$ and before the end of period $T_3$, however, the sensor will generate codewords with a degree of 2.

When a codeword of a degree i is received by a sensor before the end of a period $T_i$, the codeword will be passed on to a neighboring sensor without modification. When a codeword of a degree i is received by a sensor after the end of a period $T_i$, the sensor can perform an XOR operation on the codeword with its own data unit prior to passing the degree-increased codeword on to a neighboring sensor. In the event that the codeword already contains the data unit of the sending sensor, the codeword can be passed on without modification. Such a codeword may then be passed on from sensor to sensor without modification until a sensor whose data unit is not encoded into the codeword is encountered.

In this manner, codewords generated by the sensors "grow" in terms of their degree as they travel en-route to a data storage unit. Values $T_1$ to $T_N$ can be chosen so that codewords that arrive at a data storage unit (e.g., data storage unit 104*b* in network 100) follows a desired degree distribution. For example, if the degree distribution of equation (3) is desired, values $T_1$ to $T_N$ can be chosen as $K_1$ to $K_N$ according to equations (1) and (2). In this case, if a data storage unit receives one codeword per time unit, it can receive degree 1 codewords for the first $K_1$ time units, followed by degree 2 codewords until time $K_2$, and so on. If there are multiple sink nodes, or that a sink node receives codewords from multiple sensors, such that multiple codewords are received per time unit, then the values of $K_i$ may be scaled to achieve the desired effect.

In a sensor network that generates codewords of increasing degree, sensors can also take measurements and generate new data units in successive time periods. As discussed above, clustering of codewords can be used to allow more data to be saved in each sensor. In this case, because codewords of all time periods in a cluster can share the same coefficient, they can be "grown" to a higher degree (i.e., encoded with an addition data unit) together, for example, when a codeword of the most recent time period in the cluster is grown. Because a larger cluster size can reduce the time over which a codeword can grow, an appropriate cluster size can be selected to maximize this time. In some embodiments, the number of codewords per cluster can be selected as:

$$g_m = \frac{\sqrt{2Ss_c} - s_c}{s_d}.$$

where S is the memory size of the sensor, $s_c$ is the amount of memory space required for storing a coefficient, and $s_d$ is the amount of memory space required for storing data of a codeword.

In some embodiments, computing devices (or peers) in a P2P network can encode and transmit blocks of a file, so that the file can be effectively distributed across the P2P network. Initially, one or more seeding devices in the network possess the file. To distribute the file to a larger group of computing devices in the network, a seeding device can partition the file into multiple blocks (or data units) and randomly distribute the data units to a number of other devices, which can then encode received data units into codewords and exchange codewords with one another. Upon receiving one or more codewords, a computing device that desires the file can also decode the codewords using data units and/or codewords that have already been received and/or decoded. For example, upon receiving a codeword encoded from data units X3, X4 and X5, a computing device that has previously received a codeword encoded from X4 and X5 can use the two received codewords to recover data unit X3. Using data unit X3, a later received codeword encoded from X3 and X2 can then be decoded to recover data unit X2. As another example, if a computing device has already received and/or decoded all the data units that make up a file except X1, it may request any codeword that is encoded from X1 from other peers in the network and decode the codeword to obtain X1. At this point, the file can be reconstructed from the data units.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for forming a linear combination of sensor data collected by a plurality of sensor devices including a first sensor device, a second sensor device and a third sensor device, comprising:
    receiving at the third sensor device a first codeword transmitted from the first sensor device, wherein the first codeword comprises a linear combination of at least a first data unit, comprising sensor data collected by the first sensor device, and a second data unit, comprising sensor data collected by the second sensor device and transmitted to the first sensor device, wherein the plurality of sensor devices is distributed across a geographical area in a peer-to-peer (P2P) sensor network and wherein each of the plurality of sensor devices in the P2P sensor network is configured for taking measurements of at least one of surrounding physical conditions;
    encoding at the third sensor device the first codeword and a third data unit comprising sensor data collected by the third sensor device to form a second codeword, wherein the second codeword comprises a linear combination of at least the first data unit, the second data unit, and the third data unit; and
    transmitting from the third sensor device the second codeword.

2. The method of claim 1, wherein the encoding comprises performing a bitwise exclusive-or (XOR) operation on the first codeword and the third data unit.

3. The method of claim 1, wherein the encoding further comprises compressing the third data unit to reduce a size of the third data unit.

4. The method of claim 1, wherein the receiving, the encoding and the transmitting are repeated at predetermined time intervals.

5. The method of claim 1, further comprising periodically acquiring new sensor data at one or more of the first sensor device, the second sensor device, and the third sensor device.

6. The method of claim 1, wherein the first data unit, the second data unit, and the third data unit comprise at least a portion of a file.

7. The method of claim 1, further comprising distributing the first data unit, the second data unit, and the third data unit to one or more additional computing devices in the peer-to-peer network.

8. The method of claim 1, wherein the second codeword further comprises identification information identifying the first data unit, the second data unit, and the third data unit.

9. The method of claim 8, further comprising:
    determining a format for storing the identification information based on a number of data units encoded by the second codeword.

10. The method of claim 8, further comprising:
    storing the first codeword and a third codeword at the third sensor device, wherein the first codeword and the third codeword share identification information that identifies data units encoded by the first codeword and the third codeword.

11. The method of claim 1, further comprising:
    receiving the first codeword at a first point in time; and
    decoding the first codeword to recover the first data unit.

12. The method of claim 11, further comprising:
    receiving the second codeword at a second point in time that is subsequent to the first point in time; and
    decoding the second codeword to recover the third data unit using the first data unit and the second data unit.

13. The method of claim 1, wherein the surrounding physical conditions include surrounding environmental conditions.

14. The method of claim 13, wherein the surrounding environmental conditions include at least one of floods, fires, earthquakes, and landslides.

15. A system for forming a linear combination of sensor data, comprising:
    a plurality of sensor devices for collecting sensor data, wherein the plurality of sensor devices is distributed across a geographical area in a peer-to-peer (P2P) sensor network and includes a first sensor device, a second sensor device and a third sensor device and wherein each of the plurality of sensor devices in the P2P sensor network is configured for taking measurements of at least one of surrounding physical conditions,
    wherein the first sensor device:
        receives a first codeword transmitted from the second sensor device, wherein the first codeword comprises a linear combination of at least a first data unit, comprising sensor data collected by the second sensor device, and a second data unit, comprising sensor data collected by the third sensor device and transmitted to the second sensor device;
        encodes the first codeword and a third data unit, comprising sensor data collected by the first sensor device, to form a second codeword, wherein the second codeword comprises a linear combination of at least the first data unit, the second data unit, and the third data unit; and
        transmits the second codeword.

16. The system of claim 15, wherein in encoding, the first sensor device performs a bitwise exclusive-or (XOR) operation on the first codeword and the third data unit.

17. The system of claim 15, wherein in encoding, the first sensor device also compresses the third data unit to reduce a size of the third data unit.

18. The system of claim 15, wherein the first sensor device receives, encodes and transmits at predetermined time intervals.

19. The system of claim 15, wherein the first sensor device periodically acquires new sensor data.

20. The system of claim 15, wherein the first data unit, the second data unit, and the third data unit comprise at least a portion of a file.

21. The system of claim 15, wherein the second codeword further comprises information identifying the first data unit, the second data unit, and the third data unit.

22. The system of claim 21, wherein the first sensor device further determines a format for storing the identification information based on a number of data units encoded by the second codeword.

23. The system of claim 21, wherein the first sensor device further stores the first codeword and a third codeword, the first codeword and the third codeword share identification information that identifies data units encoded by the first codeword and the third codeword.

24. The system of claim 23, wherein the first sensor device also:
receives the second codeword at a second point in time that is subsequent to the first point in time; and
decodes the second codeword to recover the third data unit using the first data unit and the second data unit.

25. The system of claim 15, wherein the first sensor device also:
receives the first codeword at a first point in time; and
decodes the first codeword to recover the first data unit.

26. The system of claim 15, wherein the surrounding physical conditions include surrounding environmental conditions.

27. The system of claim 26, wherein the surrounding environmental conditions include at least one of floods, fires, earthquakes, and landslides.

28. A non-transitory computer-readable medium containing computer executable instructions that, when executed by a processor, cause the processor to perform a method for forming a linear combination of sensor data collected by a plurality of sensor devices including a first sensor device, a second sensor device and a third sensor device, the method comprising:
receiving at the third sensor device a first codeword transmitted from athe first sensor device, wherein the first codeword comprises a linear combination of at least a first data unit, comprising sensor data collected by the first sensor device, and a second data unit, comprising sensor data collected by the second sensor device and transmitted to the first sensor device, wherein the plurality of sensor devices is distributed across a geographical area in a peer-to-peer (P2P) sensor network and wherein each of the plurality of sensor devices in the P2P sensor network is configured for taking measurements of at least one of surrounding physical conditions;
encoding at the third sensor device the first codeword and a third data unit comprising sensor data collected by the third sensor device to form a second codeword, wherein the second codeword comprises a linear combination of at least the first data unit, the second data unit, and the third data unit; and
transmitting from the third sensor device the second codeword.

29. The medium of claim 28, wherein the encoding comprises performing a bitwise exclusive-or (XOR) operation on the first codeword and the third data unit.

30. The medium of claim 28, wherein the encoding further comprises compressing the third data unit to reduce a size of the third data unit.

31. The medium of claim 28, wherein the first data unit, the second data unit, and the third data unit comprise at least a portion of a file.

32. The medium of claim 28, wherein the second codeword further comprises identification information identifying the first data unit, the second data unit, and the third data unit.

33. The medium of claim 32, wherein the method further comprises:
determining a format for storing the identification information based on a number of data units encoded by the second codeword.

34. The medium of claim 32, wherein the method further comprises:
storing the first codeword and a third codeword at the third sensor device, wherein the first codeword and the third codeword share identification information that identifies data units encoded by the first codeword and the third codeword.

35. The medium of claim 28, wherein the method further comprises:
receiving the first codeword at a first point in time; and
decoding the first codeword to recover the first data unit.

36. The medium of claim 28, wherein the method further comprises:
receiving the second codeword at a second point in time that is subsequent to the first point in time; and
decoding the second codeword to recover the third data unit using the first data unit and the second data unit.

37. The medium of claim 28, wherein the surrounding physical conditions include surrounding environmental conditions.

38. The medium of claim 37, wherein the surrounding environmental conditions include at least one of floods, fires, earthquakes, and landslides.

* * * * *

UNITED STATES PATENT AND TRADEMARK OFFICE
CERTIFICATE OF CORRECTION

PATENT NO. : 8,655,839 B2  Page 1 of 1
APPLICATION NO. : 12/281457
DATED : February 18, 2014
INVENTOR(S) : Kamra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this

Twenty-ninth Day of September, 2015

Michelle K. Lee
*Director of the United States Patent and Trademark Office*